Patented Apr. 18, 1939

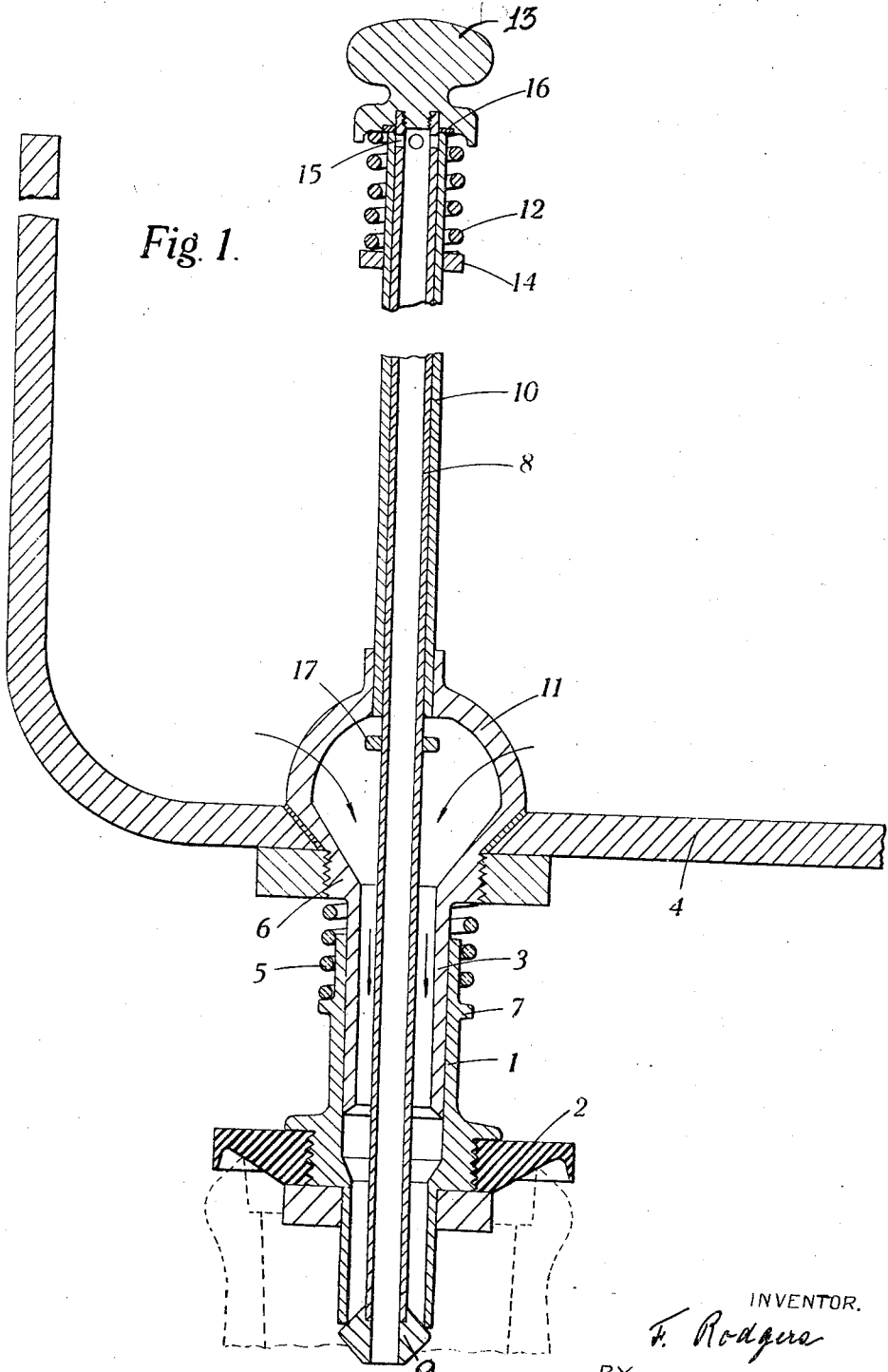

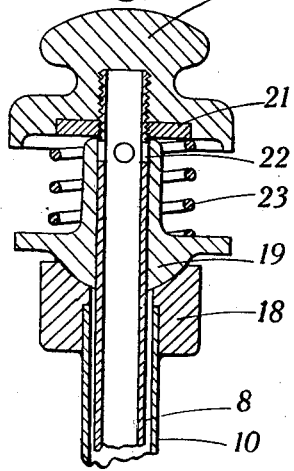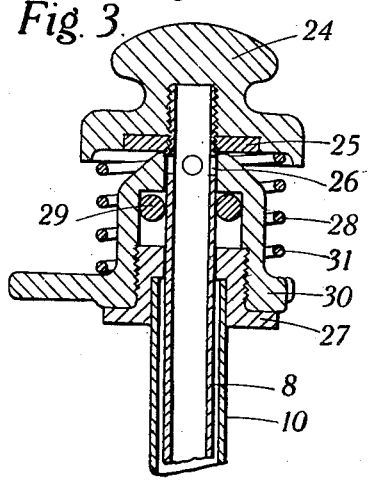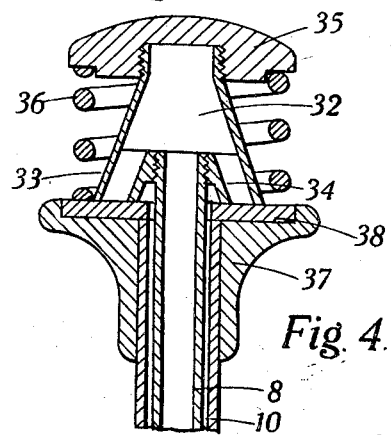

2,154,583

UNITED STATES PATENT OFFICE 2,154,583

VALVE FOR CONTROLLING THE FLOW OF LIQUIDS TO BOTTLES AND OTHER RECEPTACLES

Frederick Rodgers, London, England, assignor to Cherry-Burrell Corporation, Wilmington, Del., a corporation of Delaware Application April 28, 1937, Serial No. 139,626
In Great Britain April 28, 1936

11 Claims. (Cl. 226—124)

The present invention relates to valves for controlling the flow of liquids to bottles and other receptacles of the kind having means for sealing the mouth of the receptacle during the filling operation and a vent tube for evacuating the air displaced by the liquid as it flows into the receptacle.

Valves of this kind are used in automatic bottle filling machines and in one form of milk bottle filling machine the milk is dispensed through one or more valves from a tank in which it is contained in bulk into bottles which are fed in succession to the machine, the opening and closing of the one or more valves being controlled automatically by the bottles as they pass through the machine. The member for sealing the bottle mouth is carried by a sleeve slidably mounted upon a tube depending from the tank, the sleeve being biased in one direction by a spring. The lower end of the sleeve is adapted to co-operate with a seat carried at the end of the vent tube. During filling of a bottle the lower end of the vent tube is usually disposed some distance within the bottle, and there is a tendency for milk to flow up the vent tube. This milk is returned to the bottle from the vent tube as it is being removed after closure of the valve and may result in spilling of milk.

It has been proposed to provide a valve as indicated above for a bottle filling machine in which the lower end of the vent tube is automatically closed when the bottle is withdrawn from the valve to prevent milk from flowing therefrom.

The chief object of the present invention is to provide a valve of the kind referred to in which flow of liquid from the vent tube when the filled receptacle is moved away from the valve is prevented in an improved manner.

With this object in view the present invention consists in a valve for controlling the flow of liquids to bottles and other receptacles from a bulk supply tank, comprising a liquid supply tube adapted to be secured to said tank, a sleeve biased for movement in one direction slidably mounted upon said tube, a sealing member for the receptacle mouth, said member being carried by said sleeve, a vent tube biased for limited movement in the opposite direction to said sleeve, said vent tube being disposed axially within said liquid supply tube and having the upper end thereof extending above the level of the liquid in said bulk supply tank, a valve seat carried by the vent tube for co-operation with the lower end of the sleeve, and means disposed above the level of the liquid in said bulk supply tank and co-operating with the upper end of said vent tube, whereby said upper end is opened upon movement of a receptacle into filling relation with the valve and closed upon movement of said receptacle away from said valve.

In order that the present invention may be more clearly understood and readily carried into effect reference may now be had to the accompanying drawings illustrating the same by way of example and in which:—

Fig. 1 is a cross sectional view of one form of valve according to the present invention; and Figs. 2-4 are cross sectional views illustrating three modified forms of valves according to the present invention.

In the form of valve shown in Fig. 1, 1 is a sleeve carrying a member 2 adapted for sealing the mouth of a receptacle shown in dotted lines. The sleeve 1 is slidably mounted upon a tube 3 depending from a tank 4 adapted to contain liquid in bulk, and is biased in one direction, namely downwardly, by a spring 5, for example by a helical spring, abutting at one end against a shoulder 6 on the tube 3 and at the other end against a shoulder 7 on the sleeve 1.

Axially disposed within the tube 3 is a second or vent tube 8 of smaller diameter carrying at its lower end a seating 9 for cooperation with the lower end of the sleeve 1. The second tube 8 is capable of a limited axial movement with respect to a third tube 10 carried by a stationary part 11 of the apparatus, the part 11 being in this case an extension of the tube 3. The tube 8 is biased in one direction, namely upwardly, by a helical spring 12 which abuts at one end against a member or cap 13 carried by the second tube 8 and at the other end against a shoulder 14 carried by the third tube 10. The second tube 8 has at its upper end one or more apertures 15 adapted when the tube is moved sufficiently relatively to the third tube 10 to permit communication with the atmosphere, and the member 13 carries at its lower face a washer or seal 16—for example a rubber ring—for preventing the entry of air to the tube 8 when the apertures 15 are closed by being disposed below the upper end of the tube 10.

Axial movement of the second tube 8 is limited by engagement of an abutment 17 carried thereby with the stationary part 11 of the apparatus.

When the valve is closed the lower end of the sleeve 1 is biased by its spring 5 into engagement with the seating 9 carried by the second tube 8 and in this position the spring 12 between the second and third tubes 8 and 10 is under compression. Accordingly when the sleeve 1 is moved against the action of its spring 5 by engagement of the sealing member 2 carried thereby with the mouth of the receptacle, the sleeve 1 and the second tube 8 will travel together for a distance sufficient to bring the apertures 15 at the upper end of the second tube 8 into communication with the atmosphere and the abutment 17 into engagement with the stationary part 11 of the apparatus to prevent further movement of the second tube 8. Continued movement of the sleeve 1 from this position separates the lower end thereof from the seating 9 carried by the second tube 8 and milk is allowed to flow into the bottle from the tank by way of the annular space between tubes 3 and 8 as illustrated by the arrows, the air in the receptacle being displaced and flowing upwardly through the second tube 8 and out through the apertures 15 at the upper end thereof. When the receptacle has been filled its removal causes, in the first place, movement of the sleeve 1 to bring its lower end into engagement with the seating 9 carried by the second tube 8 and the supply of milk is cut off. The sleeve 1 and second tube 8 then move together under the action of the spring 5 biasing the sleeve 1, and against the action of the spring 12 between the second and third tubes 8 and 10, to bring the apertures 15 in the second tube 8 below the upper end of the tube 10 and the washer or seal 16 into operative position. Any milk within the second tube 8 is thereby prevented from flowing therefrom.

Figs. 2, 3 and 4 illustrate modifications of the upper end of a valve as shown in Fig. 1 for the purpose of facilitating more effective cooperation between the seating 9 and the lower end of the sleeve 1 and for preventing seepage of liquid upwardly between the tubes 8 and 10.

In the modification shown in Fig. 2 the upper end of the second or vent tube 8—which in this case is of smaller diameter than the third tube 10—projects beyond the upper end of the third tube 10 which is shaped to provide, or carries, a semi-spherical socket 18. The upper end of the second tube 8 projects through and is slidable with respect to a ball member 19 with which it has a close fit and the bottom of the member is semispherical in shape as shown for co-operation with the socket 18.

The top of the second tube 8 is closed by a cap 20 carrying a washer or seal 21 of suitable material, such as rubber, on its lower side which bears on the top of the ball member 19 when the valve is closed, and one or more holes 22 are provided in the wall of the second tube 8 in such a position that the said hole or holes is or are just below the cap 20 when in position on the tube.

A helical spring 23 which is normally under compression is arranged between the cap 20 and a suitably formed surface on ball member 19 and serves to maintain the ball member 19 in engagement with the socket 18 and also to effect axial movement of the second tube 8.

The fit between the member 19 and the second tube 8 is such that there is little or no tendency for liquid to be drawn upwardly between the tubes 8 and 10 by liquid retained in the tube 8 when the flow from the supply tank is cut off, and owing to the fact that the lower end of the vent tube 8 is capable of lateral movement more effective cooperation between the seating 9 and the lower end of the sleeve 1 is obtainable.

In the modification shown in Fig. 3 the tube 8 is of smaller diameter than the tube 10, projects at its upper end beyond the upper end of the tube 10 and has a cap 24 secured thereon, for example by screwing. The cap 24 has an insert of resilient material 25, such as rubber, on its lower face and holes 26 are provided in the second tube in such a position that they are unobstructed by the cap 24 when in position on the tube 8.

A collar 27 is carried at the upper end of the tube 10 and a bell shaped member 28 is detachably secured to the collar 27 and provides a housing for an annular resilient washer 29, such as an annular rubber ring of circular cross section. The resilient washer 29 is of such size that when in position in the housing 28 it is pressed firmly against the interior wall thereof at one side and against the exterior of the second tube 8 on the other side and thereby effectively seals the annular space between the second and third tubes. The bell shaped member 28 has, at its upper end, a portion which closely surrounds the tube 8 and closes the holes 26 therein when the vent tube is in valve closing position.

Exteriorly the bell shaped member 28 has a flange 30 and a helical spring 31 bears at one end thereon and at its other end on the aforesaid cap closing the end of the second tube. The spring 31 acts similarly to the spring 12 of the arrangement shown in Fig. 1.

In the modification shown in Fig. 4 the tube 8 is of smaller diameter than the tube 10 and has a hollow member 32 having downwardly facing tube-like portions 33, 34, the extremities of which provide two downwardly facing apertures secured, as by screwing, to its upper end. The top of the hollow member is closed by a cap 35, and a helical spring 36 is arranged between the under face of the cap and the upper face of a flanged element 37 secured at the end of the third tube 10. Normally the spring 36 is under compression and presses upwardly upon the cap and consequently upon the hollow member 32 and tube 8 which are secured thereto.

The extremities of the tube-like portions 33, 34 of the hollow member 32 are adapted in the closed position of the valve to contact with the flanged element which preferably has a resilient washer or seal 38—for example a rubber washer—secured to, or let into, its face for the purpose of effectively closing the apertures provided thereby.

The operation of valves embodying the modifications of Figs. 2, 3 and 4 will it is thought be clear without further description from a consideration of them in conjunction with Fig. 1.

What I claim is:

1. A valve for controlling the flow of liquids to bottles and other receptacles from a bulk supply tank, comprising a liquid supply tube adapted to be secured to said tank, a sleeve biased for movement in one direction slidably mounted upon said tube, a sealing member for the receptacle mouth, said member being carried by said sleeve, a vent tube biased for limited movement in the opposite direction to said sleeve, said vent tube being disposed axially within said liquid supply tube and having the upper end thereof extending above the level of the liquid in said bulk supply tank, a valve seat carried by the vent tube for co-operation with the lower end of the sleeve, and means disposed above the level of the liquid in said bulk supply tank and co-operating with the upper end of said vent tube, whereby said upper end is opened upon movement of a receptacle into filling relation with the valve and closed upon movement of said receptacle away from said valve.

2. A valve for controlling the flow of liquids to bottles and other receptacles from a bulk supply tank, comprising a liquid supply tube adapted to be secured to the tank, a sleeve biased for movement in one direction slidably mounted upon said tube, a sealing member for the receptacle mouth, said member being carried by said sleeve, a vent tube biased for limited movement in the opposite direction to said sleeve, said vent tube being disposed axially within said liquid supply tube and having the upper end thereof extending above the level of the liquid in said bulk supply tank, a valve seat carried by the vent tube for co-operation with the lower end of said sleeve, a cap for closing the upper end of said vent tube, said vent tube having an aperture in the wall thereof below said cap, and a stationary member co-operating with the upper end of said vent tube, whereby said upper end is opened upon movement of a receptacle into filling relation with the valve and closed upon movement of said receptacle away from said valve.

3. A valve controlling the flow of liquids to bottles and other receptacles from a bulk supply tank, comprising a liquid supply tube adapted to be secured to said tank, a sleeve biased for movement in one direction slidably mounted upon the tube, a sealing member for the receptacle mouth, said member being carried by said sleeve, a vent tube biased for limited movement in the opposite direction to said sleeve, said vent tube being disposed axially within said liquid supply tube and having the upper end thereof extending above the level of the liquid in said bulk supply tank, a valve seat carried by said vent tube for co-operation with the lower end of said sleeve, a cap for closing the upper end of said vent tube, said vent tube having an aperture in the wall thereof below said cap, a stationary tubular member closely surrounding said vent tube and having a shoulder thereon, and spring means between said shoulder and said cap.

4. A valve for controlling the flow of liquids to bottles and other receptacles from a bulk supply tank, comprising a liquid supply tube adapted to be secured to said tank, a sleeve biased for movement in one direction slidably mounted upon said tube, a sealing member for the receptacle mouth, said member being carried by said sleeve, a vent tube biased for limited movement in the opposite direction to said sleeve, said vent tube being disposed axially within said liquid supply tube and having the upper end thereof extending above the level of the liquid in said bulk supply tank, a valve seat carried by said vent tube for co-operation with the lower end of said sleeve, a cap for closing the upper end of said vent tube, said vent tube having an aperture in the wall thereof below said cap, a stationary member surrounding said vent tube, and mounting means associated with said member and with said vent tube permitting a limited swinging movement of said vent tube, said means cooperating with the apertured portion of the vent tube to control the opening and the closing of said vent tube at the upper end thereof.

5. A valve as claimed in claim 4, in which said mounting means comprise a member having a semi-spherical base closely surrounding said vent tube, said member being slidable with respect to said vent tube, a socket of corresponding form to said base secured to said stationary member and affording a seat for said member, and a spring provided between said member and said cap.

6. A valve for controlling the flow of liquids to bottles and other receptacles from a bulk supply tank, comprising a liquid supply tube adapted to be secured to said tank, a sleeve biased for movement in one direction slidably mounted upon said tube, a sealing member for the receptacle mouth, said member being carried by said sleeve, a vent tube biased for limited movement in the opposite direction to said sleeve, said vent tube being disposed axially within said liquid supply tube, and having the upper end thereof extending above the level of the liquid in said bulk supply tank, a valve seat carried by said vent tube for co-operation with the lower end of the sleeve, a cap for closing the upper end of said vent tube, said vent tube having an aperture in the wall thereof below said cap, a stationary member surrounding said vent tube, guiding means for the upper end of said vent tube secured to said member, a bell-shaped member secured to said guiding means, said bell-shaped member co-operating with the apertured portion of said vent tube to control the opening and the closing of the upper end of said vent tube, and an annular washer disposed within said member and maintained thereby in close engagement with said vent tube.

7. A valve as claimed in claim 6, in which a spring is arranged between said bell-shaped member and said cap at the upper end of said vent tube.

8. A valve for controlling the flow of liquids to bottles and other receptacles from a bulk supply tank, comprising a liquid supply tube adapted to be secured to said tank, a sleeve biased for movement in one direction slidably mounted upon said tube, a sealing member for the receptacle mouth, said member being carried by said sleeve, a vent tube biased for limited movement in the opposite direction to said sleeve, said vent tube being disposed axially within said liquid supply tube and having the upper end thereof extending above the level of the liquid in said bulk supply tank, a valve seat carried by said vent tube for co-operation with the lower end of said sleeve, a flanged stationary member surrounding said vent tube, a hollow member provided at the upper end of said vent tube, said hollow member having downwardly facing tube-like portions the outlet ends of which co-operate with the flange of said stationary member to open and close communication between said vent tube and the surrounding atmosphere.

9. A valve as claimed in claim 8, in which a spring is arranged between said flanged member and said hollow member.

10. A valve for controlling the flow of liquids to bottles and other receptacles from a bulk supply tank, comprising a liquid supply tube adapted to be secured to said tank, a sleeve slidably mounted upon said tube, a spring urging said sleeve in one direction, a sealing member for the receptacle mouth, said member being carried by said sleeve, a vent tube having a limited movement, a spring weaker than said first mentioned spring urging said tube in the opposite direction to said sleeve, said vent tube being disposed axially within said liquid supply tube and having the upper end thereof extending above the level of the liquid in said bulk supply tank, a valve seat carried by said vent tube for cooperation with the lower end of said sleeve and means disposed above the level of the liquid in said bulk supply tank and cooperating with the upper end of said vent tube whereby said upper end is opened upon movement of the receptacle into filling relation with the valve and closed upon movement of said receptacle away from said valve.

11. A valve for controlling the flow of liquids to bottles and other receptacles from a bulk supply tank, comprising a liquid supply tube adapted to be secured to said tank, a sleeve biased for movement in one direction slidably mounted upon said tube, a sealing member for the receptacle mouth, said member being carried by said sleeve, a vent tube biased for limited movement in the opposite direction to said sleeve, said vent tube being disposed axially within said liquid supply tube and having the upper end thereof extending above the level of the liquid in said bulk supply tank, a valve seat carried by the vent tube for cooperation with the lower end of the sleeve, and means disposed above the level of the liquid in said bulk supply tank and cooperating with the upper end of said vent tube, whereby said upper end is opened upon movement of a receptacle into filling relation with the valve and closed upon movement of said receptacle away from said valve and said upper end being opened before the unseating of said valve seat from said sleeve and being closed after the seating of said valve seat against said sleeve.

FREDERICK RODGERS.